(12) United States Patent
McNab, Jr. et al.

(10) Patent No.: US 6,214,202 B1
(45) Date of Patent: Apr. 10, 2001

(54) SITU TREATMENT OF CONTAMINATED GROUNDWATER

(75) Inventors: Walt W. McNab, Jr., Concord; Roberto Ruiz, Tracy; Tristan M. Pico, Livermore, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/596,852

(22) Filed: Jun. 19, 2000

(51) Int. Cl.[7] .................................................. C02F 1/461
(52) U.S. Cl. ..................... 205/687; 205/688; 205/742; 205/754; 205/766; 204/515; 204/648; 204/666; 588/204
(58) Field of Search ...................... 205/687, 688, 205/742, 766, 754; 204/515, 648, 666; 588/204

(56) References Cited

U.S. PATENT DOCUMENTS

| | | | |
|---|---|---|---|
| 5,332,496 | 7/1994 | Rasouli et al. | 210/180 |
| 5,398,756 | 3/1995 | Brodsky et al. | 166/248 |
| 5,403,450 | 4/1995 | Mellor et al. | 204/131 |
| 5,458,747 | 10/1995 | Marks et al. | 204/130 |
| 5,476,992 | 12/1995 | Ho et al. | 588/204 |
| 6,004,451 | * 12/1999 | Rock et al. | 204/515 |

* cited by examiner

Primary Examiner—Arun S. Phasge
(74) Attorney, Agent, or Firm—Alan H. Thompson; L. E. Carnahan

(57) ABSTRACT

A system for treating dissolved halogenated organic compounds in groundwater that relies upon electrolytically-generated hydrogen to chemically reduce the halogenated compounds in the presence of a suitable catalyst. A direct current is placed across at least a pair, or an array, of electrodes which are housed within groundwater wells so that hydrogen is generated at the cathode and oxygen at the anode. A pump is located within the well housing in which the cathode(s) is(are) located and draws in groundwater where it is hydrogenated via electrolysis, passes through a well-bore treatment unit, and then transported to the anode well(s) for reinjection into the ground. The well-bore treatment involves a permeable cylinder located in the well bore and containing a packed bed of catalyst material that facilitates the reductive dehalogenation of the halogenated organic compounds by hydrogen into environmentally benign species such as ethane and methane. Also, electro-osmatic transport of contaminants toward the cathode also contributes to contaminant mass removal. The only above ground equipment required are the transfer pipes and a direct circuit power supply for the electrodes. The electrode wells in an array may be used in pairs or one anode well may be used with a plurality of cathode wells. The DC current flow between electrode wells may be periodically reversed which controls the formation of mineral deposits in the alkaline cathode well-bore water, as well as to help rejuvenate the catalysis.

25 Claims, 2 Drawing Sheets

SITU TREATMENT OF CONTAMINATED GROUNDWATER

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to treatment of contaminated groundwater, particularly to in situ treatment of contaminated groundwater, and more particularly to a method and apparatus for in situ treatment of contaminated groundwater by catalytic reductive dehalogenation facilitated by water electrolysis with an electrode pair or array.

Contamination of groundwater resources by halogenated organic compounds poses a significant environmental problem, of requiring some form of groundwater treatment to protect public health. These common groundwater contaminants include trichloroethylene (TCE) and tetrachloroethylene (PCE). However, many conventional treatment technologies merely transfer the contaminant from one medium (water) to another medium (e.g., activated carbon), thus producing a secondary waste stream. Moreover, surface treatment systems can be cumbersome in that they often require a large surface footprint to house equipment. Recently, see U.S. Pat. No. 5,332,496 issued Jul. 26, 1994 to F. Rasouli, et al., a treatment technology has been developed involving catalytic reductive dehalogenation by hydrogen with a palladium catalyst in a system located above the ground surface.

The present invention addresses these issues, by providing a compact in situ groundwater treatment system based on chemical reduction by electrolytically-derived hydrogen for deployment within a pair or an array of well bores housing electrodes that conduct a DC current. In addition, contaminated water in fine-grained sediments between the electrodes will be drawn to the cathode well by electro-osmosis. All of the essential physical components of the treatment system are located within the well-bore (e.g., the hydrogen source and the catalyst bed), requiring only pipelines or hoses and a DC power supply to be present at the surface, thus having a minimal surface footprint and also not generating secondary waste streams.

SUMMARY OF THE INVENTION

It is an object of the present invention to provide in situ treatment for contaminated groundwater.

A further object of the invention is to provide in situ treatment for contaminated groundwater while producing only a minimal surface footprint and no secondary waste streams.

A further object of the invention is to provide a method and apparatus for in situ treatment of contaminated groundwater by catalytic reductive dehalogenation facilitated by water electrolysis with an electrode pair or array.

Another object of the invention is to provide a system for in situ treatment of contaminated groundwater wherein all of the essential physical components of the treatment system are located with the well-bores, except for electrode well to electrode well transfer pipes and a DC power supply, located above ground surface.

Another object of the invention is to provide a method and apparatus for in situ treatment of contaminated groundwater using a pair or an array of electrodes located in well-bores and a DC current is placed across each pair of electrodes, or form an electrode to one or more cathode electrodes, so that hydrogen is generated at the cathodes and oxygen at the anodes, and the well-bores each contain a treatment unit including a packet catalyst bed.

Other objects and advantages of the present invention will become apparent from the following description and accompanying drawings. The invention involves in situ treatment of contaminated groundwater by catalytic reductive dehalogenation facilitated by water electrolysis with an electrode pair or array. The apparatus for carrying out the method of this invention is primarily located within well-bores, leaving only a minimal surface footprint, and the in situ treatment method results in the production or generation of environmentally benign species such as ethane, methane, or ethene and free chloride, thereby generating no secondary waste streams. The apparatus, in addition to the well-bores, the electrodes and the packed catalyst beds located in the well-bores, includes a pump in the cathode well-bore or well bores, a water transfer pipe between cathode-to-anode well-bores, a DC power supply, an acid injection line for each cathode well-bore, and an oxygen ($O_2$) vent line for each anode well-bore. The acid injection line provides a small stream of acid which is used to titrate the solution in the cathode well-bore to thus suppress the formation of mineral deposits. The catalyst material in the packed beds may, for example, consist of 1% palladium (by weight) coated onto alumina or carbon support material in granular form. The system polarity may be periodically switched to assist in regeneration of the catalyst and for controlling the formation of mineral deposits at the cathode well-bore. Also, electro-osmotic transport of contaminants toward the cathode also contributes to contaminant mass removal. Thus, the present invention provides a compact treatment system with a minimal surface footprint and the in situ destruction of halogenated organic contaminants without generating secondary waste streams.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention involves in situ treatment of contaminated groundwater by catalytic reductive dehalogenation facilitated by water electrolysis with an electrode pair or array. The invention enables destroying plumes of dissolved halogenated organic compounds, specifically including, but not limited to, common groundwater contaminants, such as trichloroethylene (TCE) and tetrachloroethylene (PCE).

Figure 1:
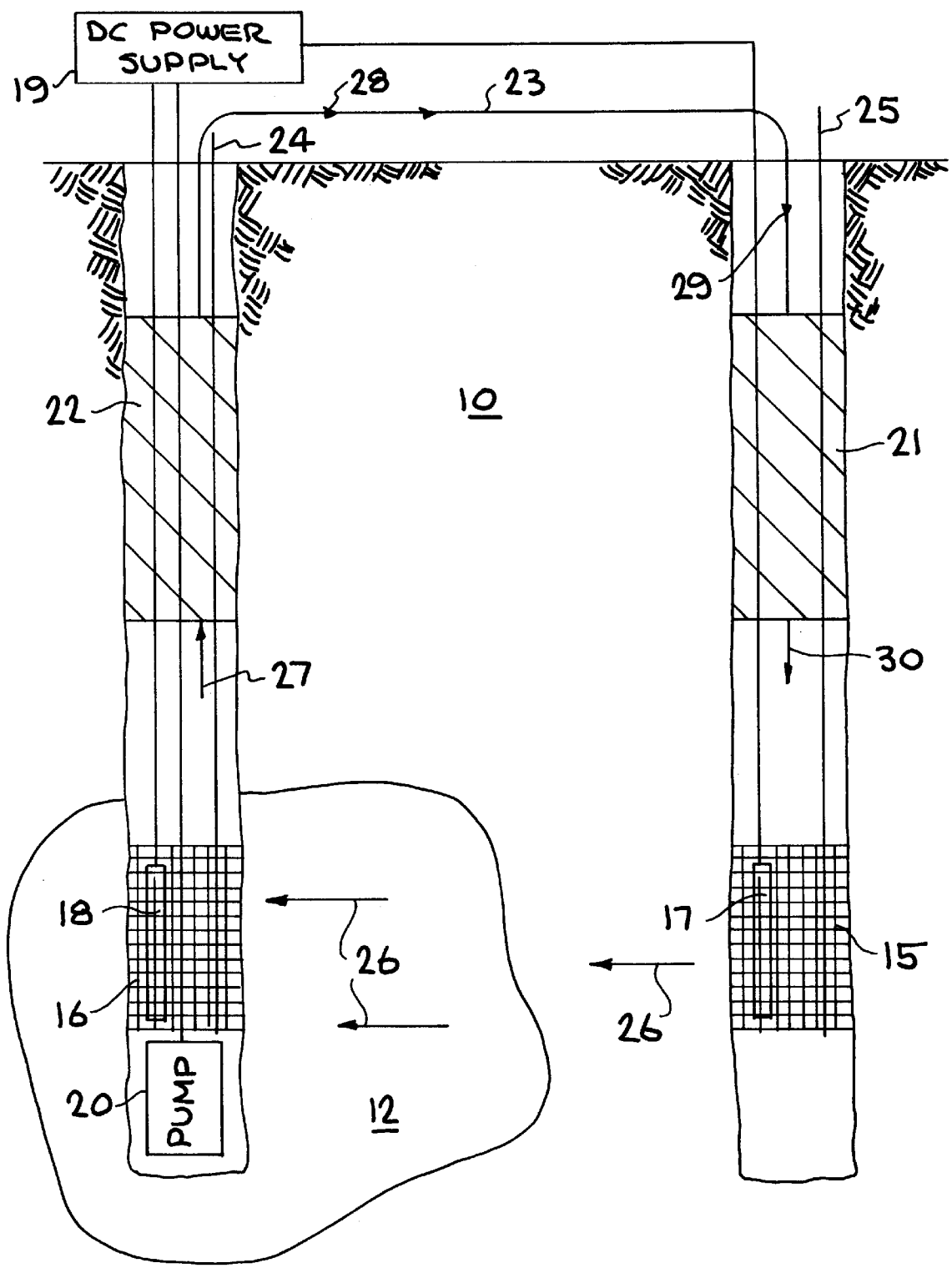
FIG. 1 schematically illustrates the invention utilizing a pair of spaced electrode well-bores with the cathode well-bore located in contaminated groundwater.

The essential elements of the system of the invention are illustrated in FIG. 1, and described in detail hereinafter. Contaminated groundwater is drawn to an extraction well using a pump. An electrode of some suitable material, such as graphite is placed within the extraction well as well as in an accompanying well where the water will ultimately be discharged (a discharge well). A voltage difference is applied across the electrode to induce a direct current (DC) to flow between the positively-charged electrode (anode) at the discharge well and the negatively-charged electrode (cathode) at the extraction well. Contaminated groundwater is drawn to the extraction well primarily by hydraulic pumping action, although relatively small amounts of water will also be drawn to the well by electro-osmosis. The current and voltage are chosen in conjunction with the electrical conductivity of the surrounding saturated geologic media and the pumping rate so that a significant quantity of dissolved hydrogen is produced at the cathode. For example, a current of 15 amps is sufficient to saturate the water at the cathode with $H_2$ at 1 atmosphere total pressure under a flow rate of 1 GPM.

As seen in FIG. 1, the composition adjacent the discharge well is $2H_2O \rightarrow O_2 + 4H^+ + 4e^-$
while the composition at the extraction well is $2H_2O + 2e^- \rightarrow H_2 + 2OH^-$.
The hydrogen at the extraction well mixes with the contaminants pumped into the well-bore and is then passed into a catalyst bed located in the well-bore. The catalyst material consists, for example, of 1% palladium (Pd), by weight, coated onto alumina, carbon, or hydrophobic zeolite support material in granular form. In addition to palladium, platinum or nickel may be used. Once in contact with the catalyst, hydrogen acts as a reducing agent to rapidly dehalogenate the contaminants, reducing them to environmentally-benign substances such as ethane, methane, or ethene and free chloride. This is illustrated in FIG. 1 as $TCE + 4H_2 \rightarrow ethane + 3H^+ + 3Cl^-$. The treated water is then carried by surface piping to the discharge well, where it is passed through a second catalyst bed, located in the well-bore, as a polishing step before discharge back into the formation. A small stream of an acid, such as 1M HCl, $H_2SO_4$, or $HNO_3$, is supplied by a small injection line and used to titrate the solution in the extraction (cathode) well-bore to neutralize the alkaline pH and thus suppress the formation of mineral deposits. Also, an $O_2$ vent line is located in the discharge (anode) well-bore.

Referring now to FIG. 1, a typical cross-section of soil, indicated at 10 and having a surface 11, includes an area 12 of contaminated ground water, which in this illustration is contaminated by TCE. A pair of well-bores 13 and 14 are drilled into soil 10, unless such previously exist, with well-bore 13 being located external of the contaminated area 12 and the lower end of well-bore 14 being located within the contaminated area 12. Each of the well-bores is provided at the lower end with a well screen 15 and 16, within which are located electrodes 17 and 18, electrode 17 to function as an anode with electrode 18 to function as a cathode. The electrodes 17 and 18 are operatively connected to a DC power supply or source 19 located on the surface 11, such DC electrical connections to down-hole electrodes being well known in the art. A pump 20 is located in the bottom of well-bore 14 and connected to power supply 19. Each well-bore 13 and 14 is provided with a packed catalyst bed 21 and 22, and the well-bores are interconnected by a water line or transfer pipe 23 located on the surface 11. An acid injection line 24 extends into the well-bore 14 and terminates adjacent the lower end of electrode 18, while an $O_2$ vent line 25 extends into the well-bore 13 and terminates adjacent the lower end of electrode 17.

Operation of the system of FIG. 1 has been described above with the DC current flow being indicated by arrows 26 and the water flow being indicated by arrows 27, 28, 29 and 30, whereby the treated contaminates are returned to the soil 10 as environmentally-benign substances, as described above. The only above-surface equipment of this system is the DC power supply 19 and to water transfer pipe 23, with treatment of the TCE in area 12 of soil 10 being totally in situ.

While the system of FIG. 1, illustrates a direct current flow path in the direction of arrows 26, that flow path (polarity of electrodes 17 and 18) can be reversed or switched periodically to allow well-oxygenated water to sweep through the packed catalyst beds which assists in rejuvenation of the catalyst beds and helps in controlling the formation of mineral deposits in the alkaline cathode well-bore water.

Figure 2:
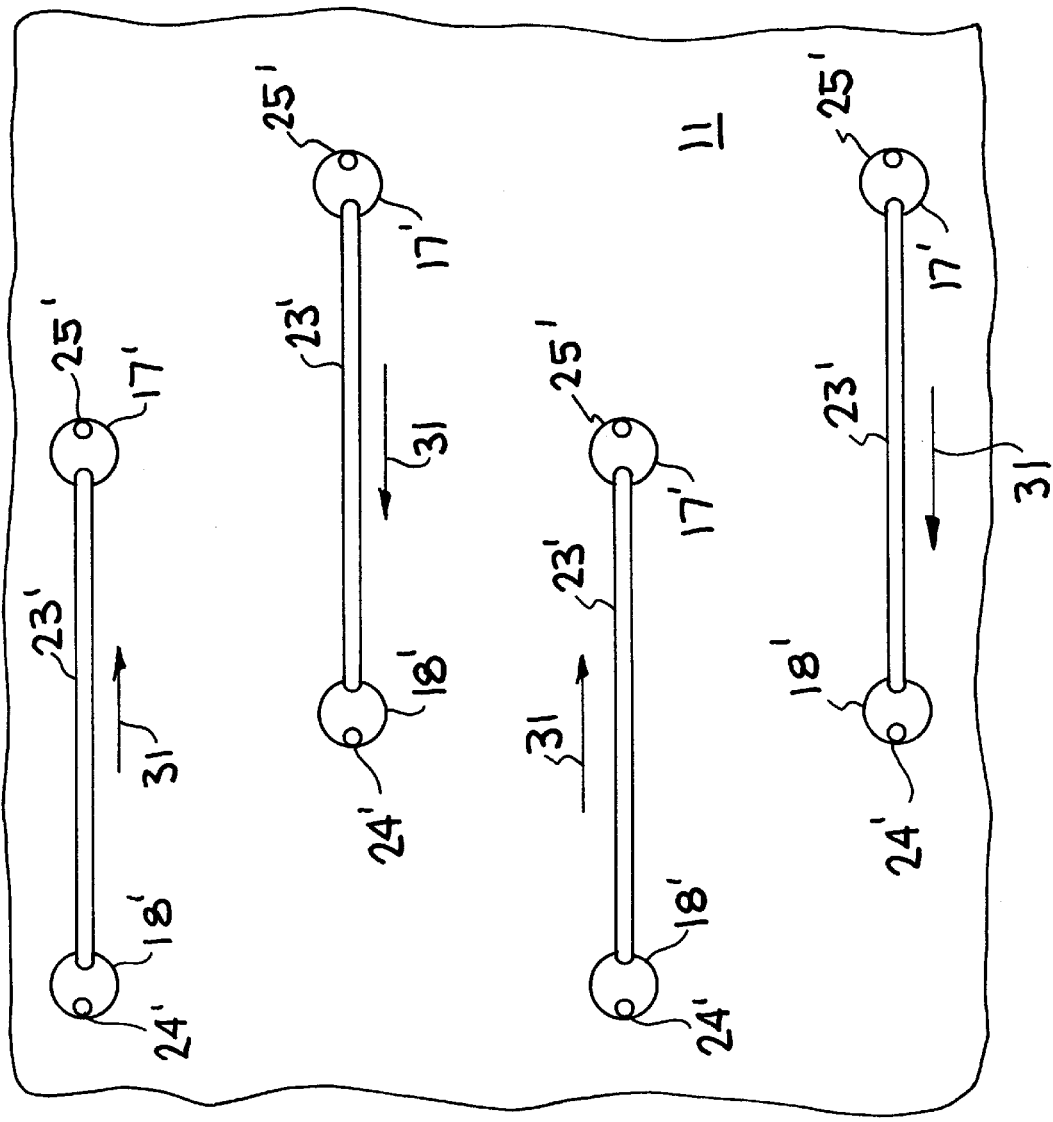
FIG. 2 schematically illustrates an array of electrode-pair well-bores and the above-surface interconnecting cathode-to-anode well-bore water transfer pipes of FIG. 1.

FIG. 2 illustrates an embodiment of an array of anode/cathode well-bores to cover a larger contamination area than the system of FIG. 1. As shown, four pairs of anode/cathode well-bores indicated at 17' and 18' are illustrated, with the direction of water flow indicated by arrows 31 in above-ground pipes 23' of each set of the well-bores being in opposite directions. Each set of well-bores 17'–18' is provided with an acid injection line 24' and an $O_2$ vent line 25'.

It is understood that the array of FIG. 2 can be modified in accordance with the size and shape of the contaminated area. Also, for example, a single anode well-bore may be used in conjunction with a plurality of cathode well-bores, with the treated water output of the cathode well-bores being directed into the single anode well-bore.

It has thus been shown that single or multiple pairs of extraction (cathode) and discharge (anode) wells may be deployed to effect groundwater remediation over either small or large areas. The separation of the cathodes and anodes into extraction and discharge wells, respectively, serves three purposes:

1. The extraction-discharge well pair(s) will serve to hydraulically sweep contaminants into the cathode well(s) for destruction. In addition, contaminated water in fine-grained sediments between the electrodes will be drawn to the cathode well by electro-osmosis.

2. Electrolylically-generated oxygen, which can interfere with the reductive dehalogenation process by competing with halogenated organic compounds for hydrogen and hence slow the destruction rate, is separated from the hydrogen source.

3. The catalyst, which will reversibly de-activate as Pd metal is converted to Pd-hydride in the presence of hydrogen, can be more easily regenerated if the cathode and anode are kept well-separated. Periodic switching of system polarity will allow well-oxygenated water to sweep through the Pd-hydride, facilitating its reduction back to Pd-metal in the absence of hydrogen. This switching will also help in controlling the formation of mineral deposits in the alkaline cathode well-bore water.

It has thus been shown that the present invention provides an in situ system for treating dissolved halogenated organic compounds in groundwater that relies upon electrolytically-generated hydrogen to chemically reduce the halogenated compounds in the presence of a suitable catalyst (e.g., palladium). The system utilizes a well-bore treatment which consists of a permeable cylinder containing a packed bed of catalyst material that facilitates the reductive dehalogenation of the halogenated organic compounds by hydrogen into environmentally benign species, such as ethane and methane which are discharged back into the soil, via a transfer line located above the surface from the cathode-well-bore to the anode well-bore. This approach not only provides in situ treatment of the contaminants but also offers the advantages of a compact system with minimal surface footprint and the destruction of a suite of halogenated organic contaminants without generating secondary waste streams.

While particular embodiments, materials, parameters, etc. have been illustrated and or described to exemplify and teach the principles of the invention, such are not intended to be limited. Modifications and changes may become apparent to those skilled in the art, and it is intended that the invention be limited only by the scope of the appended claims.

What is claimed is:

1. A method for in situ treatment of contaminated groundwater containing halogenated organic compounds, comprising:
   providing at least a pair of electrodes in a pair of spaced well-bores,
   providing a pump in one of the well-bores,
   providing a catalyst bed in at least the one well-bore,
   interconnecting the well-bores at upper end sections thereof,
   directing a DC current across the electrode to generate hydrogen at one electrode of the pair and oxygen at another electrode of the pair, and
   directing contaminated groundwater and hydrogen through the catalyst bed in the one well-bore and into the other well-bore,
   whereby contaminants in the groundwater are converted to environmentally benign species.

2. The method of claim 1, additionally including providing the other well-bore with a catalyst bed.

3. The method of claim 1, additionally including providing a DC source operatively connected to the pair of electrodes such that the electrode in the one well-bore functions as a cathode, and the electrode in the other well-bore functions as an anode.

4. The method of claim 1, additionally including forming the catalyst bed from a granular material coated with a metal selected from the group consisting of palladium, platinum, and nickel.

5. The method of claim 4, wherein the metal in the catalyst bed consists of 1% palladium by weight, and the granular material is selected from the group consisting of alumina, carbon, and hydrophobic zeolite.

6. The method of claim 1, additionally providing an acid in the one well-bore.

7. The method of claim 6, wherein providing the acid is carried out by providing 1 M HCl to titrate the solution in the one well-bore to neutralize the alkaline pH therein and thus suppress the formation of mineral deposits.

8. The method of claim 1, additionally providing means for removing $O_2$ from the other well-bore.

9. The method of claim 1, additionally including periodically switching polarity of the electrodes to assist in rejuvenation of the catalyst bed and control the formation of mineral deposits in the one well-bore.

10. The method of claim 1, additionally including providing a number of pairs of electrodes in a number of well-bores, at least one electrode of each pair being located in a contaminated groundwater area.

11. The method of claim 1, additionally including providing a number of electrodes in a number of well-bores, and connecting the electrodes to a DC power source such that one of the electrodes functions as an anode and the other of the number of electrodes each function as a cathode.

12. The method of claim 1, wherein contaminated groundwater is drawn to one of the well-bores by pumping action and by electro-osmotic transport.

13. A system for in situ treatment of contaminated groundwater containing dissolved halogenated organic compounds, comprising:
   at least one pair of spaced well-bores,
   an electrode located in each of said at least one pair of well-bores,
   a DC source connected to said electrodes such that one functions as an anode and one as a cathode, thereby forming an anode well-bore and a cathode well-bore,
   a pump located in the cathode well-bore,
   a catalyst bed located in at least the cathode well-bore, and
   a water line interconnecting an upper portion of the cathode well-bore with the anode well-bore.

14. The system of claim 13, wherein only the DC source and the water line are located above ground surface.

15. The system of claim 13, wherein at least the cathode well-bore extends into an area containing contaminated groundwater.

16. The system of claim 13, additionally including means for adding an acid stream to said cathode well-bore.

17. The system of claim 16, wherein the acid added to said cathode well-bore consists of 1M HCl to suppress formation of mineral deposits at the cathode well-bore.

18. The system of claim 13, additionally including means for venting $O_2$ from the anode well-bore.

19. The system of claim 13, additionally including a catalyst bed located in the anode well-bore.

20. The system of claim 13, additionally including a well screen located in each well-bore and about each of said electrodes.

21. The system of claim 13, wherein said at least one catalyst bed is composed of granular material coated with a metal selected from the group consisting of palladium, platinum, and nickel.

22. The system of claim 21, wherein said granular material is selected from the group consisting of alumina, carbon, and hydrophobic zeolite.

23. The system of claim 22, wherein said metal comprises 1% of palladium by weight.

24. The system of claim 13, additionally including a number of pairs of well-bores, each having an electrode therein connected to said DC source, to form at least one anode well-bore and a number of cathode well-bores, each of said cathode well-bores having a pump and catalyst bed located therein, each cathode well-bore being connected to an anode well-bore by a water line.

25. The system of claim 24, additionally including a catalyst bed in said at least one anode well-bore.

* * * * *

UNITED STATES PATENT AND TRADEMARK OFFICE
CERTIFICATE OF CORRECTION

PATENT NO.    : 6,214,202 B1
DATED         : April 10, 2001
INVENTOR(S)   : Walt W. McNah Jr. et al.

Page 1 of 1

It is certified that error appears in the above-identified patent and that said Letters Patent is hereby corrected as shown below:

<u>Title page,</u>
Item [54], the title should read -- IN SITU TREATMENT OF CONTAMINATED GROUNDWATER --

Signed and Sealed this

Seventh Day of January, 2003

JAMES E. ROGAN
*Director of the United States Patent and Trademark Office*